United States Patent [19]

Huang et al.

[11] Patent Number: 4,966,446
[45] Date of Patent: Oct. 30, 1990

[54] MASK CONTROLLED COUPLING OF INTER-SUBSTRATE OPTICAL COMPONENTS

[75] Inventors: Alan Huang, Middletown; Jurgen Jahns, Shrewsbury, both of N.J.

[73] Assignee: AT&T Bell Laboratories, Murray Hill, N.J.

[21] Appl. No.: 345,754

[22] Filed: Apr. 28, 1989

[51] Int. Cl.$^5$ .................. B29D 11/00; G02B 7/00; G02B 3/08; G02B 5/08
[52] U.S. Cl. .................. 350/417; 350/162.23; 350/162.22; 350/321; 350/452; 350/501; 350/613; 430/321; 437/984; 437/924
[58] Field of Search .................. 350/162.22, 171, 321, 350/417, 445, 452, 501, 504, 569, 162.23, 613, 642, 162.17, 96.11, 162.16; 430/321; 355/240; 358/472, 484, 487; 437/984, 924

[56] References Cited

U.S. PATENT DOCUMENTS 3,631,360 12/1971 Lehovec .................. 350/162.16
4,079,404 3/1978 Comerford et al. .................. 350/96.11

OTHER PUBLICATIONS

Goodman, Joseph W. et al., "Optical Interconnections for VLSI Systems" *Proceedings of the IEEE*, vol. 72, No. 7, Jul. 1984.
Firester, A. H. et al., "Fabrication of Planar Optical Phase Elements", *Optics Communications*, vol. 8, No. 2, Jun. 1973.
"Diffractive-Reflective Optical Interconnects" K. Brenner and F. Sauer *Applied Optics* vol. 27, No. 20, 15 Oct. 1988.

*Primary Examiner*—Bruce Y. Arnold
*Assistant Examiner*—David R. Parsons
*Attorney, Agent, or Firm*—Henry T. Brendzel

[57] ABSTRACT

Alignment difficulties in optical computing arrangements are overcome by integrating the optical components on a single substrate and arranging the elements in a manner that causes them to interact with one another to perform the desired function. The substrate has one or two major surfaces and the elements are grown or fabricated on those surfaces using conventional integrated circuit manufacturing techniques. Recognizing that an optical circuit can be larger than what can be fabricated on a single substrate, aligning structures are fabricated onto substrates that need to be coupled to form the optical circuit. The aligning structures contain registrable protrusion and indentation portions, such as ridges and grooves, that are imbedded into the substrates as part of the manufacturing process of the optical elements. Most advantageously, the position-sensitive optical devices are manufactured on one side.

15 Claims, 6 Drawing Sheets

MASK CONTROLLED COUPLING OF INTER-SUBSTRATE OPTICAL COMPONENTS

BACKGROUND OF THE INVENTION

This application is related to a number of applications filed on even date herewith for the same inventors, bearing the titles: "Planar Reflective Optical Devices", "Integration of Free-Space Planar Optical Components", and "Integrated Optics Facsimile Apparatus".

This relates to integrated optics for free space computing environments. More particularly, this relates to techniques for developing interacting arrays of optical elements that need not be aligned with cumbersome mechanical arrangements in order to realize free space computing.

Current optical systems employ a variety of optical components, such as lenses and beam splitters, which are mounted and aligned by mechanical means. In complex optical systems which consist of many individual components, the alignment and the stability of these components become critical issues. The alignment problem becomes particularly severe when the required precision approaches the limits of conventional fine mechanics.

In free-space optical computing systems the required precision is related to the size of the optical logic gates which are used to perform logic operations, such as AND and OR functions. Typically, the sizes of the optical logic devices that are currently investigated are in the range of a few microns or less. This means that the alignment tolerances for the optical components have to be in the submicron range. Conventional mechanical alignment of optical components is possible with a precision in the range of 10 microns. Below that range, conventional techniques become increasingly expensive. This means that for the purpose of building complex optical systems which require very precise mounting, alternative technique must be devised. The issue, then, is "How do we put all the components together with a submicron precision such that the resulting arrangement will stay stable despite influences such as temperature changes, mechanical stress, aging effects, etc.".

In the semiconductor art, interconnections also present a challenge. The challenge in the semiconductor art results from the fact that electronic elements (e.g. transistors, resistors, paths, etc.) are basically planar devices and the interconnections between the electronic elements are restricted to planar paths. This is particularly troublesome for connections to and from the integrated circuits. The reason for that relates to the need to reach an edge of the integrated circuit and the need to provide sufficient current carrying capabilities to drive the signals on the input/output leads to the desired voltage levels in the presence of circuit capacitances.

To solve the interconnection problem in electronic circuits recent proposals suggest the use of free-space optical means. The configurations for optical interconnections of VLSI systems that are most relevant to this invention were described by Goodman et al. in *Proceeding of the IEEE* Vol. 72, No. 7, Jul. 1984, pp. 850–866, and more recently, by Brenner et al. in *Applied Optics* Vol. 27, No. 20, 15 Oct., 1988, pp. 4251–4254. Both publications describe arrangements where the exposed surface of an integrated circuit contains optical detectors. In the Goodman et al. arrangements light is applied either from outside the integrated circuit or from light sources at the edges of the integrated circuit. The light is directed to a hologram substrate situated above the integrated circuit's surface, and the hologram routes the optical signals to the desired detectors, based on the information imbedded in the hologram.

The Brenner et al. arrangement is similar to that of Goodman et al. in that both the light source and the detector are on the same exposed integrated circuit surface. The light is directed upwards toward a substrate that is held above the integrated circuit's exposed surface and which contains holograms at designated locations of the substrate. The holograms are at the surface of the substrate that faces the integrated circuit (the near-end surface). A mirrored surface is placed at the opposite surface of the substrate (the far-end surface). The light from an integrated circuit light source passes through the hologram of the substrate, reflects off the mirrored surface, and returns to the surface of the integrated circuit where an optical detector is situated (if the arrangement is aligned properly). In one implementation of the Brenner et al. arrangement, the light that is reflected off the far-end surface is reflected off a mirrored portion on the near-end surface, and is reflected again off the far-end surface before it reaches the integrated circuit. This allows a lengthening of the optical path and offers certain flexibility in the positioning of the light detector vis-a-vis the light source.

The above arrangements perhaps solve the problem of relaying signals to and from integrated circuits. They do not, however, solve the needs of an optical computing system. First, they do not obviate the need for alignment. The holograms and the mirrors in the above-described arrangements must be aligned precisely. Second, they address only the relatively simple process of sending an optical signal from one point and receiving it at another. They do not solve the problem of creating a circuit having optical elements that more generally interact with one another. Third, the above-described systems basically deal with one-to-one or one-to-many communications, whereas optical computing applications need to relay images (a collection of spots). The importance of this difference lies in the fact that a lens inverts the image. In the case of spot to spot communication that inversion is irrelevant to the detector and thus not considered. In the case of image manipulations, in contradistinction, one may not invert portions of the image with impunity.

Directing attention to the semiconductor integrated circuit manufacturing art, it may be observed that current techniques create entire circuits on a single substrate, with the resulting attribute that the interconnection fabric for the manufactured elements is created concurrently with the circuit elements themselves. Also, the relative positioning of the circuit elements, relative to one another, is also fixed.

The latter is not necessarily important in electronic circuit embodiments because the interconnections are physical, point-to-point interconnections, within the circuit's structure. It could be vitally important in optical circuits. In the context of this invention, an optical circuit is any arrangement of optical elements such as mirrors, lenses, etc. that perform predefined transformations on optical signals.

Artisans have realized the benefits of batch semiconductor fabrication techniques for optical circuits. For example, in "Fabrication of Planar Optical Phase Elements," *Optical Communications*, Vol. 8 No. 2 Jun.

1973, pp. 160-162, Firester et al. described a technique for fabricating optical phase elements using relatively conventional fabrication techniques. Their process starts with glass covered with evaporated aluminum. The aluminum is coated with a photoresist, a binary pattern mask is applied to the photoresist, and the aluminum is chemically etched to the pattern delineated by the mask. Thereafter, the remaining photoresist is removed and a layer of thorium fluoride is deposited on top using resistance heated vacuum evaporation. Finally, the aluminum pattern is chemically etched away, leaving the thorium fluoride that was in contact with the glass.

More recently, in "Rectangular-aperture micro-Fresnel lens array fabricated by electron-beam lithography" *Applied Optics*, Vol. 26, No. 3, Feb. 1987, pp. 587-591, Shiono at al. described an electron beam approach for creating an array of Fresnel lenses where the effective etching of a coating baked onto a glass substrate is accomplished with an electronbeam writing system.

These articles demonstrate the use of batch processing techniques to create a plurality of optical elements that in combination form an array of elements. Such arrays are used to effect a particular optical element, such as a lens array, a detector array, a hologram, etc. A common characteristic of these array-elements is that energy is extracted from, or applied to, the entire manufactured array of devices as a unit. There is no uniquely designed interaction between the elements themselves that would convert their particular arrangement into a "circuit" rather than a "macro" optical element.

Thus, an unsolved need still exists for creating optical computing circuits that do not require stringent mechanical alignment.

SUMMARY OF THE INVENTION

This invention overcomes the alignment deficiencies of the prior art optical computing by integrating all of the necessary optical components on a single substrate and arranging the elements in a manner that causes them to interact with one another to perform the desired function. This includes light sources, optical detectors, mirrored surface segments, grating segments, transmissive lenses and reflective lenses. The substrate has one or two major surfaces and the elements are grown or fabricated on those surfaces using conventional integrated circuit manufacturing techniques. In such a circuit the relative positions of the optical elements are set by the fabricating mask. The fabricating masks may be generated by an electron beam writer which offers a position accuracy on the order of 0.1 micron. The mask can be as large as several inches in diameter. The lenses can be designed to relay images (which are collections of spots) rather than just conveying light from one point to another.

Recognizing that an optical circuit can be larger than what can be fabricated on a single substrate, this invention overcomes the mechanical attachment and aligning problem by physically coupling substrates to each other with protrusion and indentation alignment means, such as ridges and grooves, that are imbedded in the substrates as part of the manufacturing process of the optical elements. In fabrication techniques that employ masks, the alignment means and the optical devices are defined on the very same mask and are thus fabricated concurrently. The resulting registration between the optical elements and the aligning means is as accurate as the resolution of the mask generating equipment. In other fabrication techniques the principle still holds that the positioning accuracy is limited only by the accuracy of the mechanism that defines the individual features of the fabricated optical devices. Connection of substrates in this manner virtually eliminates the need for separate aligning. Furthermore, the close physical connection of the substrates reduces the deleterious effects of changes in the refractive index between substrates. Most advantageously, all of the position-sensitive devices and the aligning means are fabricated on one surface of each substrate, and the other surface or surfaces of the substrate contain the position-insensitive devices, such as mirrors.

DETAILED DESCRIPTION

The kernel of this invention lies in our realization that different planar optical devices can be fabricated on a substrate, with a relative positioning of the devices being such that the devices interact optically with one another to form an optical circuit.

In one basic embodiment of our invention, the substrate is made of a transparent material, such as glass, and planar optical elements are fabricated on two surfaces of the substrate. The elements are arranged for light that enters the substrate to interact with the elements by "bouncing" within the substrate between the various lenses, beam splitters, mirrors, etc. To contain the light within the substrate, all of the planar optical devices are covered with a reflective coating.

In another basic embodiment of our invention, the substrate upon which planar optical elements are fabricated can be opaque, and a transparent substrate is placed on top of the optical elements. The transparent substrate contains at least a mirrored surface, but it can also contain other and more complex planar optical elements in accordance with the aforementioned first embodiment of our invention. The advantage of the second embodiment lies in the fact that the first, opaque, substrate can be made of material that has desirable properties which are not found in transparent materials. For example, various devices such as optical detectors, lasers, etc. cannot presently be manufactured from transparent materials but can be manufactured from a semiconductor substrate.

To interconnect these and other substrates that contain optical devices, in accordance with our invention interlocking elements are created in the course of the fabrication process of the optical elements themselves. This insures extremely tight tolerances to the interlocking substrates.

Figure 1:
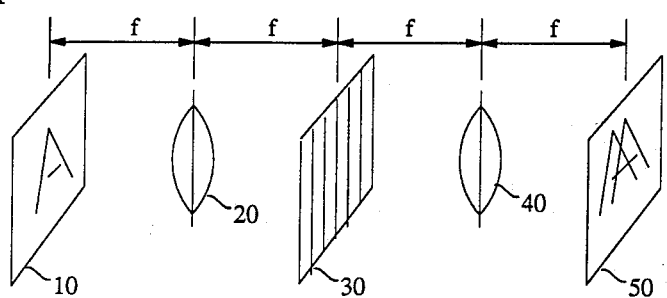
FIG. 1 depicts a 4-f imaging setup that includes two lenses and a grating element.

FIG. 1 depicts a typical 4-f imaging setup comprising an image 10 at a first plane, a lens 20 situated one focal distance away from image 10 and a phase grating plate 30 situated one focal distance away from lens 20 and two focal distances away from image 10. One more focal distance away from image 10 (coaxially with lens 20 and phase grating 30) there is lens 40 and still one more focal distance away from image 10, there is imaging plane 50. The optical setup of FIG. 1 is quite general since it can be used for simple imaging, but also for other applications in analog or digital data processing. For example, this setup can be used to implement one stage of the perfect shuffle interconnection network following the teachings of Brenner and Huang in U.S. Pat. No. 4,931,959. Phase grating plate 30 can be designed to realize a simple beam splitter which results in the desired spatial shifting of one image at surface 50 with respect to the other. The shifting can be arranged (as described in the aforementioned application) to form the perfect shuffle arrangement.

Figure 2:
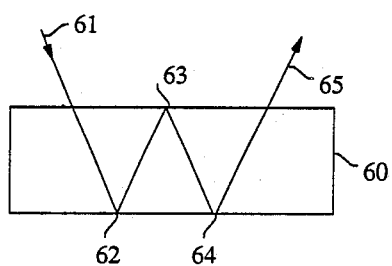
FIG. 2 presents a folded version of the FIG. 1 imaging setup in accordance with the principles of our invention.
Figure 7:
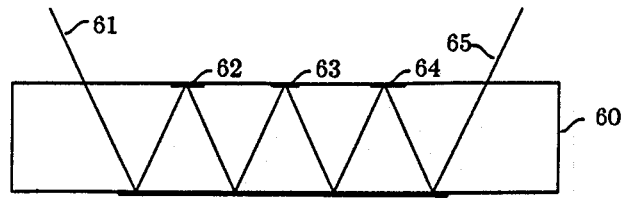
FIG. 7 depicts a transparent substrate with the lenses forming the circuit situated on the top surface.

In accordance with our invention, the FIG. 1 arrangement can be realized with the arrangement depicted in FIGS. 2, and 7.

FIG. 2 depicts, in a cross-sectional view, our basic idea of employing the VLSI techniques for fabricating planar optical components to form optical circuits that avoid the difficulties of optical component alignments. The substrate in FIG. 2 (60) is transparent. Incoming light, following path 61, is applied to planar lens 62 that is fabricated on the bottom surface of substrate 60. The outer surface of lens 62 (the surface away from the glass substrate) is coated with a reflective layer to make lens 62 a reflective lens. The light passing through planar lens 62 is reflected, therefore, and reaches the top surface of substrate 60 where a planar beam splitter 63 is fabricated. The outer surface of planar beam splitter 63 (the surface away from the glass substrate) is also coated with a reflective layer. The light passing through planar beam splitter 63 is reflected, therefore, and reaches the bottom surface of substrate 60 where a planar lens 64 is fabricated. Lens 64 is identical to lens 62. Light reflected off lens 62 exits substrate 60 along path 65.

It is clear that planar lens 62, as well as other planar optical devices can be fabricated using well known techniques. Still, one should clearly separate the concepts that relate to manufacturing of devices, and the concepts that teach the design of what should be manufactured. With respect to the former, conventional techniques are available for mass fabrication of semiconductor devices and, as indicated above, many of these techniques have been adopted for the manufacture of optical devices. As for the design of what to manufacture, interesting approaches are also available. Known approaches employ a bi-level realization of the needed optical response. One approach that I have employed is a multi-level fabrication technique which is, in effect, a digital embodiment of an analog design of a planar optical device. Growth, etching and diffusion are some of the different manufacturing techniques that are available.

Figure 3:
FIG. 3 presents a side view of a Fresnel lens.
Figure 4:
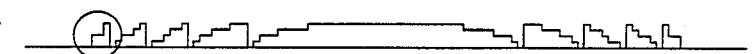
FIG. 4 presents a multi-level planar realization of the FIG. 3 lens.

FIG. 3, for example, depicts the cross-sectional view of our Fresnel lens. FIG. 4 depicts the cross-sectional view of our "planar multilevel optical lens" realization of the FIG. 3 optical device. This design can be used in the optical system of FIG. 2. The FIG. 4 realization grows the planar optical device on the substrate with a number of masks that is equal to $\log_2$ of the number of levels desired. The last step in the creation of the devices used in FIG. 2 is a reflective coating.

Figure 5A:
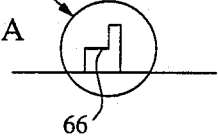
FIGS. 5A and 5B depict two arrangements for applying reflective layers applied to the FIG. 4 realization to form a reflective planar lens.
Figure 5B:
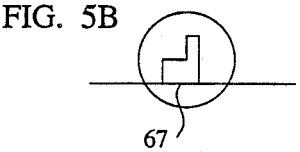

As indicated above, the optical elements in the arrangement of FIG. 2 operate on signals traveling within the substrate. Accordingly, the reflective coating is on top of the grown structure. In applications where the our planar optical elements operate on signals that reach the optical element from outside the substrate, the reflective coating may be applied as the first layer of the substrate. These variations are shown in FIGS. 5A and 5B the reflective surfaces are marked by 66 and 67.

Figure 6:
FIG. 6 illustrates an embodiment of the FIG. 4 arrangement that is developed by etching techniques.

FIG. 6 presents a lens realization that employs etching techniques rather than growth techniques. Again, the reflective layer is the step that follows the formation of the lens. It may be noted in passing that the reflective surface on the FIG. 6 realization results a lens action for light reaching planar lens from outside the substrate as well as from inside the substrate.

Returning the discussion to FIG. 2, the path between lens 62 and beam splitter 63 is fairly short. This path can be lengthened as much as necessary by simply allowing the light beams to "bounce" a number of times off the top and bottom surfaces of the substrate. An example of this arrangement is depicted in FIG. 7. One attribute of the FIG. 7 embodiment, which is not directly related to the issue of path length, is that all of the complex planar optical devices whose structure and position relative to each other are critical are on the same surface of substrate 60. The other surface of substrate 60 can be a simple reflective surface or a blazed grating.

Figure 8:
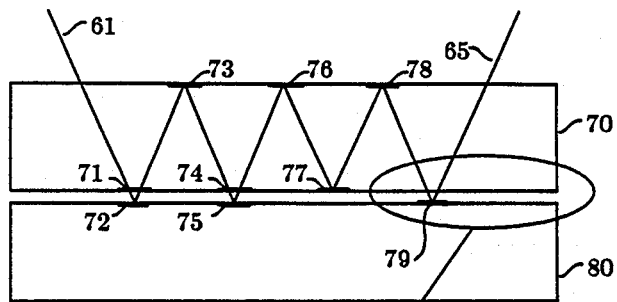
FIG. 8 depicts an arrangement of two mated substrates that permit light to interact with optical elements on both substrates.

FIG. 8 illustrates the principles of our invention when two or more substrates are used. In FIG. 8, substrate 70 is transparent whereas substrate 80 is opaque. As in FIG. 7, incoming light arrives along path 61 from outside the arrangement. It passes through planar optical devices 71 through 79 before it exits along path 65. Optical devices 73, 76 and 78 are reflective planar optical devices of the type described above in connection with FIGS. 2 and 7. They are manufactured on the top side of substrate 70. Planar device 77 is a reflective planar optical device that is manufactured on the bottom side of substrate 70, which is the side that is mated with the top side of substrate 80. Devices 71 and 74 are also manufactured on the bottom side of substrate 70, but they are transmissive planar optical devices. That is, devices 71 and 74 allow the light that is altered by the devices to reach substrate 80. As with the FIG. 7 embodiment, substantial advantages can be derived by manufacturing most, if not all, of the position-sensitive optical devices on the sides of substrates 70 and 80 that are mated to each other.

It may be noted that in the context of this invention, a reflective planar optical device is a device having some means for reflecting, such as a reflective coating, that is an integral part of the created optical device. It does not include, for example, a transmissive optical device manufactured on a transparent substrate, with a mirror on the opposite side of the substrate. This latter arrangement, in the parlance of this invention, is deemed to be an arrangement comprising a transmissive optical device and a mirror. Of course, a mirror is also an optical device. To differentiate between mirrors and more complex optical devices such as lenses, prisms, beam splitters, etc., the phrase "level A optical devices" will designate mirrors, "level B planar optical devices" will designate devices other than mirrors.

Substrate 80, includes optical elements 72, 75, and 79. They are all either reflective planar optical devices, light detectors, or light emitters.

The mating of substrates 80 and 70 presents two problems. The first problem is associated with the changes in refractive indices between substrate 70 and the air between substrates 70 and 80. In applications where substrate 80 is also transparent and transmissive optical devices are employed, the index of refraction of substrate 80 must also be taken into account. As in other applications, the problems associated with the index of refraction can be ameliorated by the use of index-matching fluid between substrates 70 and 80 or anti-reflective coatings on the surfaces.

The second mating problem for substrates 70 and 80 is simply the alignment problem between the devices on substrate 70 and the devices on substrate 80. Note, for example, that the reflective device 72 on substrate 80 must be aligned properly with the transmissive device 71 on substrate 70.

Figure 9:
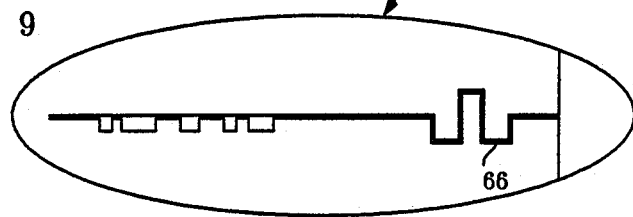
FIG. 9 illustrates the aligning means fabricated in substrate 70 and 80 of FIG. 8 that permit accurate aligning of the two substrates.

In accordance with the principles of our invention, substrates 70 and 80 are mated through use of aligning elements that are fabricated into the substrates together with the fabrication of the optical devices. More specifically, the optical devices on substrate 70 are manufactured, as indicated above, through either etching, diffusion or growing techniques, or a combination of the above, to create protrusion and indentation structures in the surface of the substrates. By using the very same mask (or whatever feature-controlling mechanism is used) that creates the optical devices to create the aligning protrusions and indentations, substrates 70 and 80 can be mated with the accuracy that is available for manufacturing the planar optical devices in the first instance. This mating is depicted in FIG. 9, which is an enlarged view of the segment in the FIG. 7 arrangement that includes a portion of optical device 79 as well as the alignment structures 66.

As indicated above, one of the advantages flowing from the arrangement of FIG. 7 is the ability to use opaque substrates that are made of a material which is more capable than quartz glass. For example, substrate 80 may be a silicon semiconductor substrate, a gallium arsenide substrate or, even, a silicon substrate upon which gallium arsenide is grown. With such a substrate, phototransistors, LEDs, optical modulator devices and lasers can be manufactured. This allows light to be detected at the substrate, manipulated optically or even electronically, and regenerated with the same or another element on the substrate.

Figure 10:
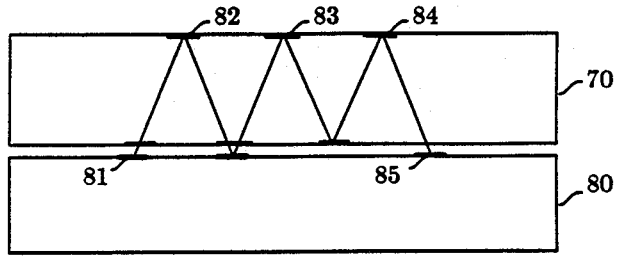
FIG. 10 depicts the arrangement of FIG. 8 with the lower substrate manufactured from a material that permits fabrication of light emitting optical devices and light detecting optical devices.

FIG. 10 depicts one embodiment where optical device 81 in substrate 80 generates light, optical devices 82, 83 and 84 in substrate 70 interact with that light, and optical device 85 in substrate 80 detects light. Of course, it is possible for substrate 80 to have devices 81 and 85 physically mounted on the substrate, although some of the advantages described in connection with the mating of substrates 70 and 80 may be more difficult to realize.

Figure 11:
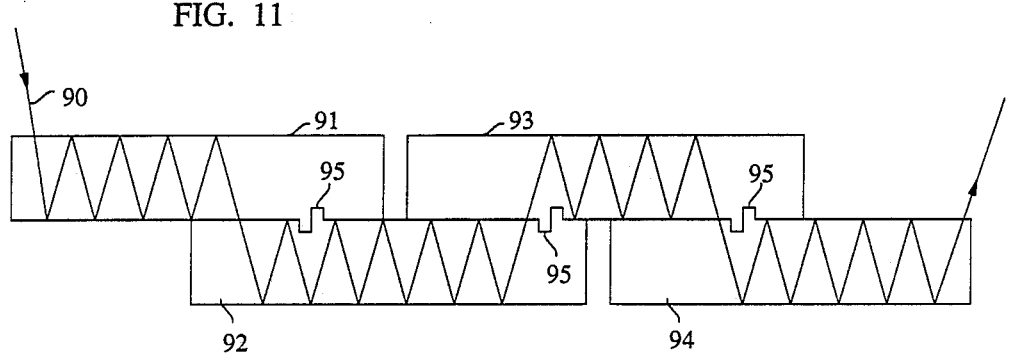
FIG. 11 depicts one arrangement for assembling a plurality of substrates that are accurately mated to each other in accordance with the principles of our invention.
Figure 12:
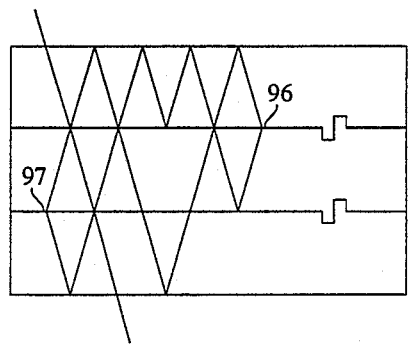
FIG. 12 depicts another arrangement for assembling a plurality of substrates that are accurately mated to each other in accordance with the principles of our invention.

FIG. 11 illustrates an arrangement for an even larger optical system than the system of FIGS. 7, 8 and 10. It comprises substrates 91, 92, 93 and 94 that are mated in an arrangement that is akin to the placing of dominoes. In this arrangement, light travels through the substrates as illustrated by path 90. In the course of its travel, the light meanders through substrate 91, then passes through to substrate 92, then 93 and finally passes to substrate 94. The substrates are mated with the aid of alignment elements 95. The same effect can be obtained in an even more compact arrangement. That arrangement, depicted in FIG. 12, represents a folding of the FIG. 11 arrangement. Two differences should be point out between the FIG. 11 and FIG. 12 embodiments. One is that at some interfaces of the FIG. 12 embodiment, where light is transmitted from one substrate to another, a transmissive planar prism optical device must be supplied to redirect the light. Devices 96 and 97 are such transmissive planar prisms. The second is that the FIG. 11 embodiment permits, in effect, the creation of a single surface. Using this attribute, the FIG. 11 embodiment would include the position-sensitive optical devices only on that single surface, which is the surface that comprises the surfaces that mate different substrates. In mentioning "position-sensitive" devices, there is the implication that some device are not position-sensitive. In some sense, all optical devices are position-sensitive. The only question is to what degree. For example, the placing of a mirror is generally not position-sensitive. A lens may be position-insensitive in two dimensions, but position-sensitive in the third dimension.

This approach differs from the point to point approaches suggested by Goodman and Brenner in that in FIG. 1 lens 20 and 40 would have to each be replaced with an array of lenslets. Each spot of image 10 would have to be relayed via a lenslet at position 20 to a lenslet at position 40 and then projected onto the corresponding point on output plane 50. This would complicate fabrication, create optical constraints and introduce spatial quantization noise such as crosstalk between adjacent spots.

The above does not address whatever problems may occur because light reaches the various optical devices at an angle that is off the perpendicular. First, because when the angle is close to 90 degrees, the problems of aberrations and astigmatism are not severe. When this is not the case, compensatory measures have to be taken. When using diffractive lenses as described in FIG. 4, it is possible to distort the patterns in one direction so that a circular pattern, for example, becomes elliptical. This would eliminate any possible astigmatism.

Another possibility is to arrange the optical system in such a way that the light always hits the opticals devices at 90 degrees. This is achieved, for example, with the setup depicted in FIG. 22. The optical arrangement consists of three layers. The top layer and the bottom layer are blazed gratings. The top layer redirects a light beam traveling under an oblique angle so that it is reflected under 90 degrees. The bottom layer redirects a light beam that travels under 90 degrees so that it is reflected under a corresponding oblique angle. In this manner, a light beam applied at a 90 degree angle to the bottom layer would reflect at an angle to the top layer, reflect again at 90 degrees to the bottom layer, and so forth.

Figure 22:
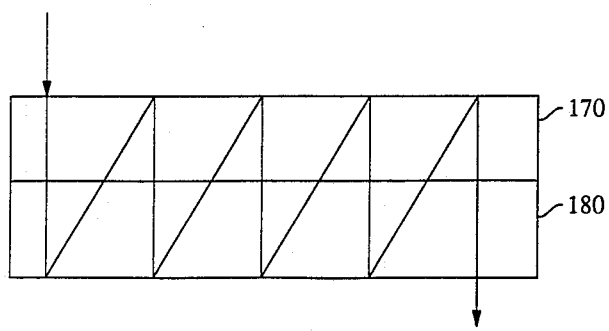
FIG. 22 depicts an arrangement that permits applying light to optical devices in a perpendicular direction.

The central layer in FIG. 22 contains optical devices such as lenses, beam splitters, etc. They are spaced far enough apart so that the light traveling at the oblique angle can pass between the optical devices, and close enough so that the light traveling at 90 degrees can pass through the devices. The top layer and the bottom layer contain windows which allows the light to enter and leave the arrangement.

The arrangement of FIG. 22 can be fabricated in a number of ways. Employing the principles of this invention, however, the arrangement of FIG. 22 can be fabricated from two substrates 170 and 180. Both substrates contain one surface on which the blazed gratings are fabricated. The other surface of one or both of the substrates can contain the optical elements necessary for implementing the optical function desired and, optionally, include the aligning means described in connection with FIGS. 8 and 9.

A multitude of applications can benefit from this invention. One such application, for example, relates to a facsimile system. Specifically, a facsimile machine includes an optical head that has the task of imaging one line of the original text or drawing onto a one-dimensional detector array. The detector array is typically a CCD line-scan camera. The de facto standard of the resolution for FAX applications is 300 dots per inch, which corresponds to a pixel diameter of approximately 85 microns, and 2400 pixels for an eight inch image line.

Therefore, it has not been possible to make an optical system which resolves that many dots and is still compact in size. Hence, present systems handle the image with many small lenses, where each lens handles only a portion of the image. Many of today's FAX machines use gradient index rod lenses which have typically a diameter of 1 mm and a focal length of 10-20 mm. The working distance, which is the distance between the sheet of paper and the lenses is therefore large enough to permit illumination of the paper from the side, at an oblique angle. This is achieved by using a one dimensional array of light emitting diodes or laser diodes. To summarize, the three major components of the optical head in a FAX system are lenses, illumination light sources, and the light detectors. Currently, these components must be assembled and aligned.

Employing the principles of our invention, the entire optical head of a FAX system can be created in a single unit.

Two different optical approaches are possible for developing such an optical head arrangement: one, where the original image is subdivided into small but extended areas in the range 0.5-1 mm; and the other, where the original image is subdivided into areas equal to the pixel size so that each and every pixel has its own optical channel.

Figure 13:
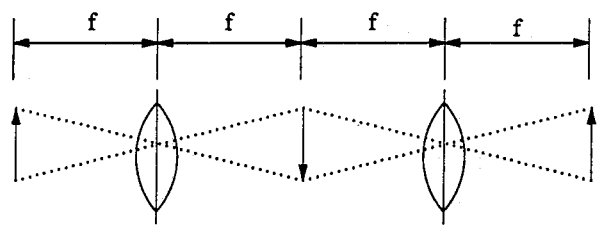
FIG. 13 illustrates one optical setup of lenses for a FAX optical head.
Figure 14:
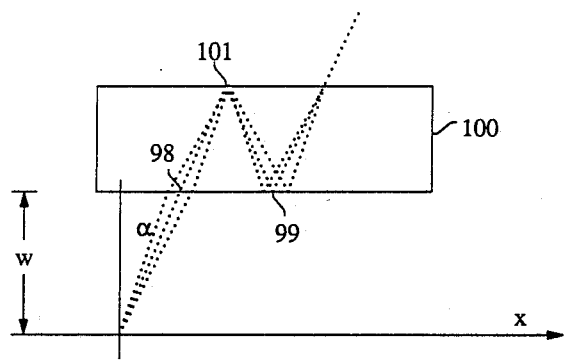
FIG. 14 illustrates the folded version of the FIG. 13 optical setup that follows the principles of our invention.

In accordance with the first approach, in order to not alter the image developed from the collection of images developed by the plurality of lenses, double imaging step, must be used. This insures an erect image. The principle is shown in FIG. 13, and its folded version is shown in FIG. 14. In the folded version, lens 98 is a transmissive lens while lens 99 is a reflective lens. Device 101 is a mirror. Both lenses, as shown in FIG. 11, are fabricated on the bottom side of substrate 100. It should be realized, of course, those lenses can also be fabricated on the top surface of substrate 100, or on both the top and the bottom surfaces. The paper containing the image, by the way, is moving in the direction marked by the arrow x, from left to right.

The diameter of lenses 98 and 99 is typically 1 mm. The working distance, w, between the moving papers and the lenses is typically 10 mm. This results in a relatively small angle $\alpha$ of approximately 5°, under the assumption that lenses 98 and 99 are of equal size without a space between them.

Figure 15:
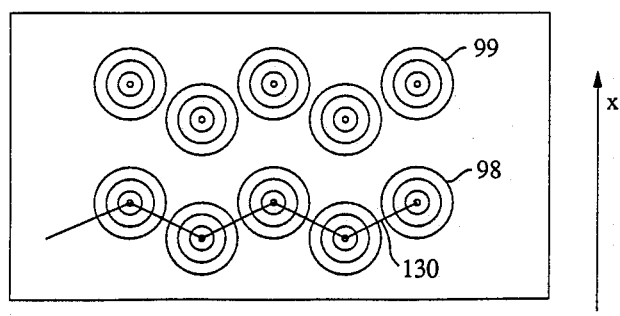
FIG. 15 presents the top view of the lens arrays in the structure depicted in FIG. 14.

Usually, the field of view of a lens is smaller than its diameter. Because of this, the lenses must be staggered spatially, as shown by line 130 in FIG. 15, if one wants to cover the entire line image. Of course, the staggering does not affect the performance of the system. It only requires a slight modification in the detector timing, in accordance with well established techniques.

Figure 16:
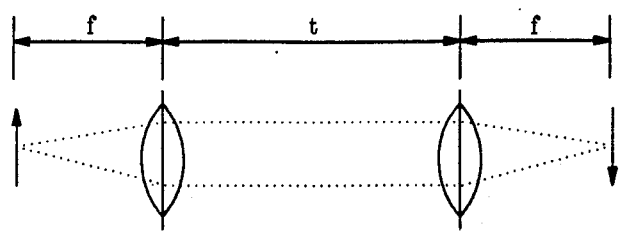
FIG. 16 illustrates another optical setup of lenses for a FAX optical head.
Figure 17:
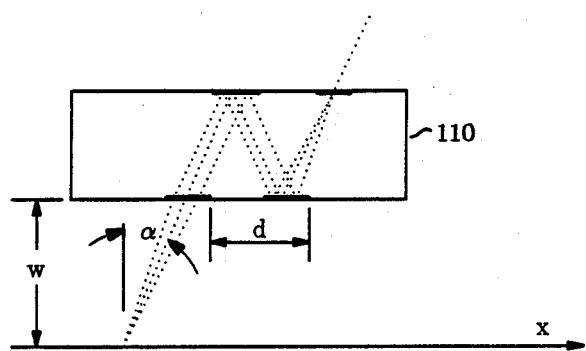
FIG. 17 illustrates the folded version of the FIG. 16 optical setup that follows the principles of our invention.

In accordance with the second approach, FIG. 16 depicts the optical arrangement when an optical channel is devoted to each pixel. The folded version of the FIG. 16 arrangement is shown in FIG. 17. This arrangement is similar to one that uses a linear array of optical fibers where every fiber transmits the intensity of light coming from a single pixel. However, using lenses which focus the light allows one to have a working distance, w, that is much greater than the working distance for optical fiber realization. In the latter realizations the working distance must be as close to 0 as practicable, and that leads to problems, such as wear, dust, etc. In the instant embodiment, the working distance can be between 1-10 mm.

Figure 18:
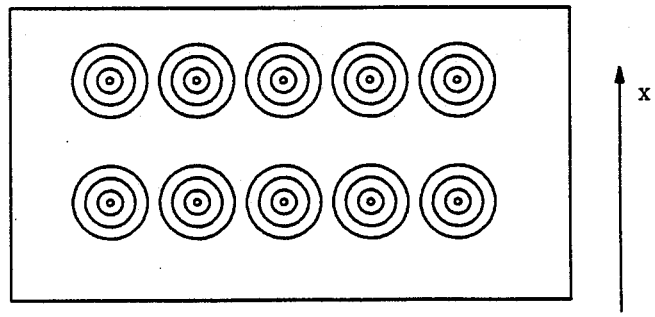
FIG. 18 presents the top view of the lens arrays in the structure depicted in FIG. 16.

One interesting aspect of the FIG. 17 approach is that double imaging is not necessary. This simplifies the optics, although in order to avoid crosstalk a collimated system as shown in FIG. 16 is suggested. The planar arrangement of the lenses in FIG. 17 is shown in FIG. 18. The distance, t, between the two lenses in FIG. 16 is not critical and, therefore, the distance d between the lenses in FIGS. 17 and 18 is also not critical (other than being dependent on the angle $\alpha$ and the thickness of the glass substrate). Again, the complex planar optical devices can be fabricated on the surface of the substrate that is removed from the paper, to improve reliability.

Figure 19:
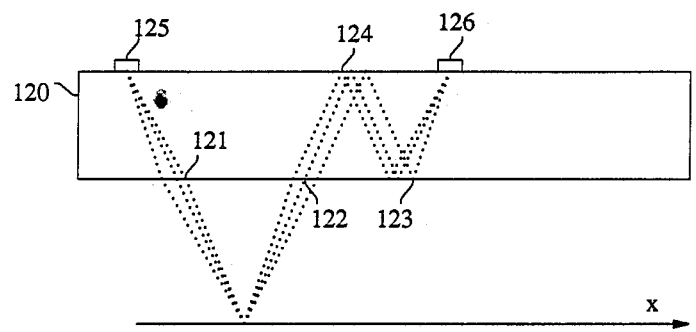
FIG. 19 includes the light emitting array of the FAX optical head of FIG. 16.
Figure 20:
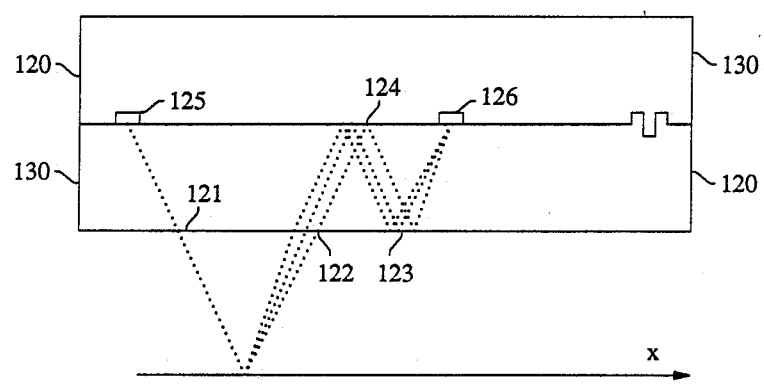
FIG. 20 illustrates one realization for the FIG. 19 setup that employs two mated substrates.

FIG. 19 presents the entire FAX optical head embodiment that includes the imaging light sources, the light focusing paths, and the detectors. More specifically, substrate 120 includes transmissive lenses 121 and 122, a reflective lens 123, a mirror 124, a light source 125 and a light detector 126. Each one of the depicted optical elements represents, of course, an entire row of elements as shown in FIG. 18. The only difficulty in realizing the arrangement of FIG. 19 lies in the creation of light sources 125 and detectors 126 on the glass substrate. The detectors can be manufactured by sputtering amorphous silicon directly on the glass substrate. The light sources, on the other hand, are more difficult to realize. Generally, LEDs and laser diodes are made of gallium arsenide and, currently, there are no known methods for integrating this material on quartz glass or on any other transparent substrate. However, in accordance with the principles of our invention, both the light sources and the detectors can be either physically mounted on substrate 120 or, in the alternative, the FAX optical head can be constructed with two mated substrates as depicted in FIG. 20. The bottom substrate, 120, is transparent and it includes the lenses. The top substrate, 130, is the one that contains the light sources and detectors.

Figure 21:
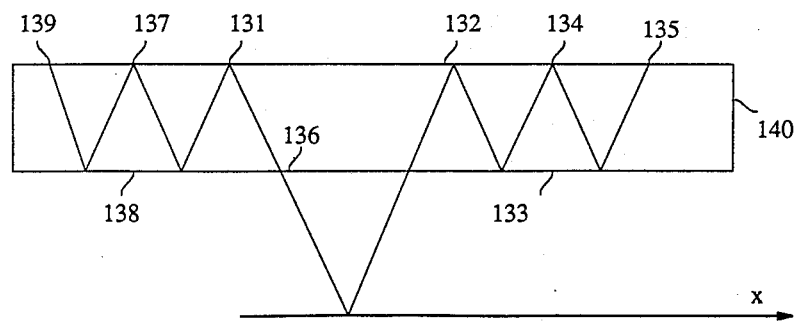
FIG. 21 presents a realization of the FAX optical head where all of the position-sensitive optical devices are constructed on the surface that is away from the moving paper.

Still another embodiment is presented in FIG. 21. It is perhaps the most compact and rugged embodiment of the optical FAX head in that it contains only a single glass substrate, only two arrays of reflective planar lenses, one mirrored surface, a light emitting array that is constructed separately and applied (e.g., glued) to the substrate's surface, and an array of light detectors constructed by sputtering amorphous silicon on the substrate and appropriately working the silicon to form photo-transistors.

In operation, light emitting array 131 shines on the paper that moves in direction x along a surface whose cross section is marked by the arrow x. The lenses in the linear array marked by 132 (the array's top view is depicted in FIG. 18) focus on a line at the surface of the paper and receive therefrom the light reflected off the paper. That light received by each of the lenses is collimated and reflected towards mirrored surface 133. The light reflected off surface 133 reaches the lenses in the linear array of lenses marked by 134 and is reflected therefrom. The light reflected off each lens in array 134 is reflected again off mirrored surface 133 and focuses on a detector in a linear array of detectors marked by 135.

Of course, a more efficient operation can be had by focusing the light onto the paper. This can be accomplished by including a planar lens at point 136. However, the FIG. 21 arrangement derives a substantial advantage from keeping all of the lenses on the surface of substrate 140 that is away from the paper; to wit, paper dust that could affect the lenses is prevented from reaching the lenses. This advantage should, perhaps, be extended to the light focusing lenses. For such an embodiment, FIG. 21 shows a light emitting array 139, a lens array 137 and a mirrored 138. Array 131, in such an embodiment is not a light emitting array but a lens array. Light emanating from light emitters 139 is collimated by lens 137 and is then focused by lens array 131 to a concentrated area of the paper.

The number of LEDs in array 139 and the number of lenses (and their positioning) is a function of whether the first design approach is used (where the optics deals with image segments) or the second design approach is used (where the optics deals with individual pixels).

The above description of the FAX optical head at least impliedly suggests that the light detecting array is as wide as the image that is sensed off the moving paper. That, of course, need not be the case. Just as the reflective lens arrays can be made to work with light that moves at an angle with respect to the x direction (see FIGS. 17-20), the array can also be made to work with light moving at an angle with respect to the direction that is perpendicular to the x direction (into the drawing). In fact, since CCD detector strips can easily be made with a resolution of 2400 pixels per inch, it makes sense to reduce the detector array to 1 inch even though the line detected off the moving paper may be 8 inches long. Using such a CCD in the optical arrangement of FIG. 21 would merely require the placing (e.g. gluing) of a conventional CCD strip on the substrate.

We claim:

1. An optical structure including a substrate, planar optical devices fabricated onto a surface of said substrate and aligning means fabricated onto said surface concurrently with said planar optical devices and by the process by which said planar optical devices are fabricated.

2. An optical structure including a substrate, planar optical devices fabricated onto a surface of said substrate and aligning means having protrusions and indentations fabricated onto said surface.

3. An optical structure including a substrate, planar optical devices fabricated onto a surface of said substrate, and three dimensional aligning means fabricated onto said surface, wherein said fabricating the optical devices and the aligning means is accomplished with the aid of a mask that defines said optical devices and said aligning means.

4. An optical system comprising:
a first optical structure including a first surface, planar optical devices fabricated onto said first optical structure and first aligning means on said first surface; and
a second optical structure including a second surface, planar optical devices fabricated onto said second optical structure and second aligning means on said second surface, with said first aligning means being registrable with said second aligning means; wherein
said first structure and said second structure are joined so that said first aligning means are registered with said second aligning means.

5. The system of claim 4 wherein at least one of said planar optical devices is a level B planar optical device.

6. The system of claim 4 wherein at least one of said planar optical devices is a reflective level B planar optical device.

7. The system of claim 4 wherein said first aligning means are ridges protruding from said first surface and said second aligning means are groves in said second surface.

8. The system of claim 4 wherein light is injected into said system, and the injected light interacts with said optical devices of said first and said second optical structures.

9. The system of claim 4 wherein said first optical structure is essentially in direct physical contact with said second optical structure.

10. The system of claim 4, including a refractive index-matching fluid between said first and second optical structures.

11. The system of claim 4 wherein said first aligning means comprise protrusions fabricated into said first optical structure and said second aligning means comprise indentations fabricated into said second optical structure.

12. The system of claim 4 wherein
said second optical structure further includes a third surface that includes third aligning means and
wherein said system further comprises a third optical structure including a fourth surface, planar optical devices fabricated onto said third optical structure and fourth aligning means on said fourth surface, with said third aligning means being registrable with said fourth aligning means, and with said third optical structure and said second optical structure joined so that said third aligning means are registered with said fourth aligning means.

13. The system of claim 4 wherein said optical devices fabricated on said first optical structure are fabricated on said first surface and wherein said optical devices fabricated onto said second optical structure are fabricated on said second surface.

14. A method for making a substrate that contains planar optical elements comprising the steps of:
employing a mask that contains features of said optical elements and features of aligning means;
applying said mask to a substrate; and etching said substrate in accordance with said mask.

15. A method for making a substrate that contains planar optical elements comprising the steps of:
employing a mask that contains features of said optical elements and features of aligning means;
applying said mask to a substrate; and depositing material on said substrate in accordance with said mask.

* * * * *